United States Patent
Oh et al.

(10) Patent No.: US 11,175,410 B2
(45) Date of Patent: Nov. 16, 2021

(54) FLEXIBLE GPS MESSAGE DECODER FOR DECODING GPS MESSAGES DURING AUTONOMOUS DRIVING

(71) Applicant: Baidu USA LLC, Sunnyvale, CA (US)

(72) Inventors: Kwan Oh, Sunnyvale, CA (US); Manjiang Zhang, Sunnyvale, CA (US); Tiffany Zhang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 405 days.

(21) Appl. No.: 16/387,169

(22) Filed: Apr. 17, 2019

(65) Prior Publication Data

US 2020/0333470 A1    Oct. 22, 2020

(51) Int. Cl.
*G01S 19/30* (2010.01)
*G05D 1/02* (2020.01)

(52) U.S. Cl.
CPC ............ *G01S 19/30* (2013.01); *G05D 1/0278* (2013.01); *G05D 2201/0213* (2013.01)

(58) Field of Classification Search
CPC .......... G01S 19/30; G01S 19/29; G01S 19/32; G01S 19/34; G01S 19/24; G05D 1/0278
USPC ................................................... 342/357.69
See application file for complete search history.

(56) References Cited

U.S. PATENT DOCUMENTS

| | | | |
|---|---|---|---|
| 6,427,120 B1* | 7/2002 | Garin | G01S 5/0009 342/357.64 |
| 10,086,782 B1* | 10/2018 | Konrardy | G08B 21/18 |
| 2009/0037033 A1* | 2/2009 | Phillips | G05D 1/0278 701/2 |
| 2009/0219202 A1* | 9/2009 | Pon | G01S 19/42 342/357.25 |
| 2019/0055016 A1* | 2/2019 | Groninga | B64C 27/18 |
| 2019/0253130 A1* | 8/2019 | Bagnall | H04B 7/18513 |
| 2020/0320807 A1* | 10/2020 | Gorti | G07C 5/0808 |
| 2021/0027033 A1* | 1/2021 | Howard | G06K 7/10722 |

* cited by examiner

*Primary Examiner* — Harry K Liu
(74) *Attorney, Agent, or Firm* — Womble Bond Dickinson (US) LLP

(57) ABSTRACT

In one embodiment, a sensor unit receives a first GPS message from a GPS sensor, where the sensor unit is coupled between sensors and a perception and planning system of an autonomous driving vehicle (ADV). The sensor unit determines a type of the first GPS message by matching a predetermined field of the first GPS message with a list of predetermined data patterns. Each of the predetermined data patterns corresponds to one of the predetermined types of GPS messages and decodes a payload of the first GPS message using a decoding algorithm associated with the type of the first GPS message.

20 Claims, 9 Drawing Sheets

430

| Type/Vendor | Mask | Pattern/Signature | Matching Rules |
|---|---|---|---|
| Type #1 | Mask #1 | Pattern 1 | |
| Type #2 | Mask #2 | Patterns 2 & 3 | OR |
| Type #3 | Mask #3 | Patterns 4 & 5 | AND |
| ... 431 | ... 432 | ... 433 | ... 434 |

FLEXIBLE GPS MESSAGE DECODER FOR DECODING GPS MESSAGES DURING AUTONOMOUS DRIVING

TECHNICAL FIELD

Embodiments of the present disclosure relate generally to operating autonomous vehicles. More particularly, embodiments of the disclosure relate to decoding a GPS message for an autonomous driving vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

A global positioning system (GPS) is widely used in autonomous driving vehicles, for example, in motion planning and control. However, there is no common standard for the use of GPS in autonomous driving vehicles. GPRMC messages used by most autonomous driving vehicle systems cannot reflect accurate time information. Some GPS module vendors use their own protocols which makes it difficult to cover different operating scenarios.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
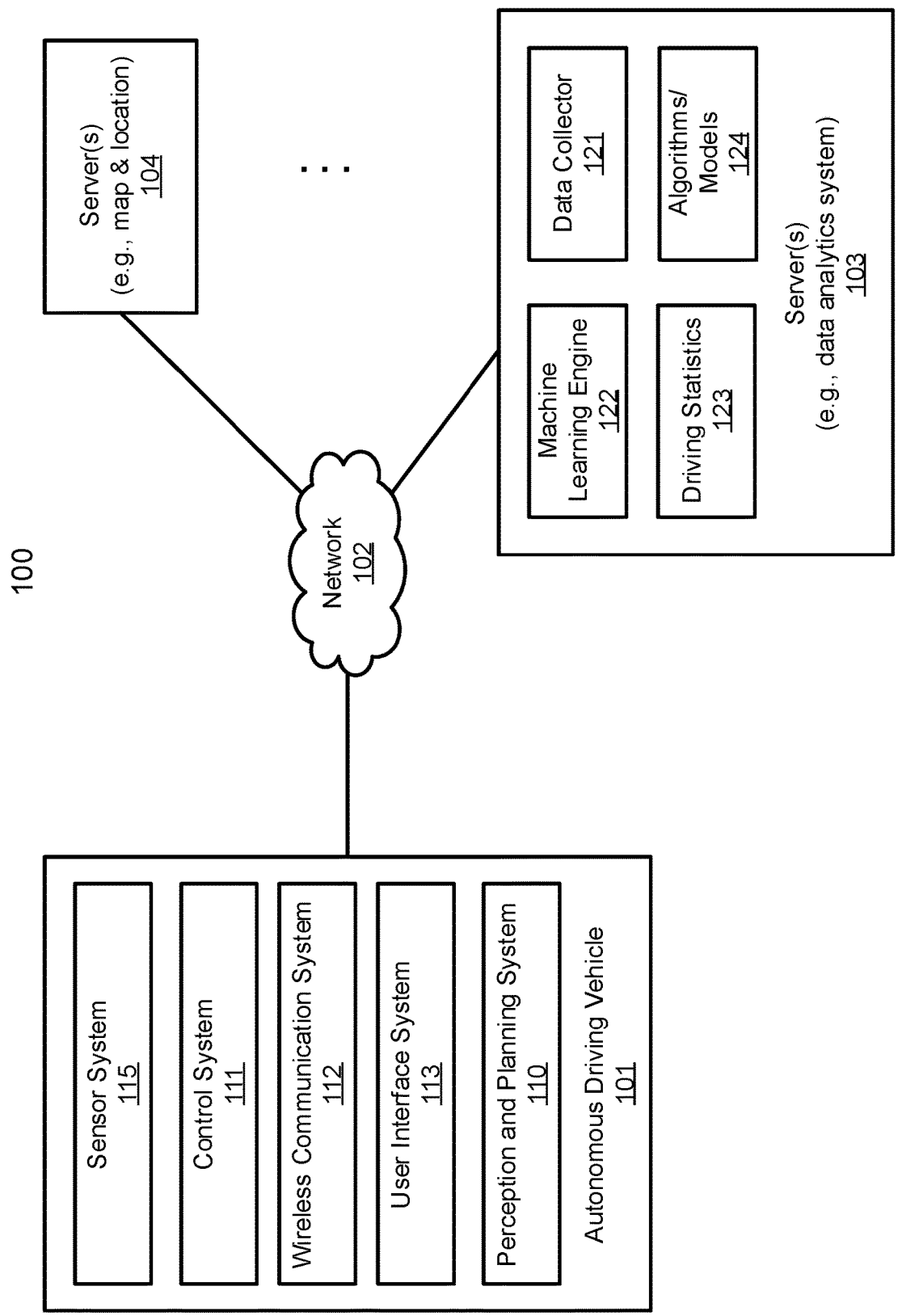
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to one aspect, a sensor unit receives a first GPS message from a GPS sensor, where the sensor unit is coupled between sensors and a perception and planning system of an autonomous driving vehicle (ADV). The sensor unit determines a type of the first GPS message by matching a predetermined field of the first GPS message with a list of predetermined data patterns. Each of the predetermined data patterns corresponds to one of the predetermined types of GPS messages and decodes a payload of the first GPS message using a decoding algorithm associated with the type of the first GPS message. A second GPS message is then generated based on the decoded payload of the first GPS message. The second GPS message is in a common format that is recognizable or understandable by other components of the autonomous driving system, such as a perception and planning system that is designed to perceive a driving environment surrounding the vehicle and to plan a path or trajectory to drive the vehicle navigating the driving environment.

In one embodiment, when matching the predetermined field of a GPS message, for each of the predetermined data patterns in the list, a mask associated with the data pattern is obtained, for example, from a lookup table. The mask is then applied to the GPS message to mask out the unrelated fields or data to select the predetermined field. The selected data is then compared with the predetermined data pattern (e.g., a signature representing the corresponding type of the GPS messages). The mask basically determines the location of the predetermined field within the GPS message. In one embodiment, the mask may be configured to mask and select multiple fields of a GPS message. The multiple fields of the GPS message may be utilized to collectively represent the type of the GPS message based on a matching rule. For example, a first field and a second field of the GPS message may be obtained by masking a mask onto the GPS message. The type of the GPS message may be determined based on matching of the first and second fields against their respective predetermined data patterns. The match rule may dictate how the matching can be utilized to determine the type of the GPS message, such as, for example, either one of the successful matching or both successful matching, etc.

According to another aspect, a sensor unit of an autonomous driving system includes a sensor interface capable of being coupled to one or more sensors (e.g., LIDAR, RADAR, cameras), including a GPS receiver, a host interface capable of being coupled to a perception and planning system of the autonomous driving system (also referred to as a host), and a GPS decoder coupled to the sensor interface and the host interface. The GPS decoder is configured to receive a first GPS message from a GPS receiver or sensor. The GPS decoder determines a type of the first GPS message by matching a predetermined field of the first GPS message with a list of predetermined data patterns or signatures. Each of the data patterns corresponds to one of the predetermined types of GPS messages. Once the type of the GPS message has been determined, the GPS decoder decodes the first GPS message using a decoding algorithm or method associated with the type of the first GPS message. The sensor unit further includes a GPS message generator to generate a second GPS message based on the decoding of the first GPS message. The second GPS message can then be utilized by other components of the autonomous driving system. According to a further aspect, an autonomous driving system includes a perception and planning system, a number of sensors, and a sensor unit coupled to the perception and planning system and the sensors. The sensor unit includes the components and functionalities as described above.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
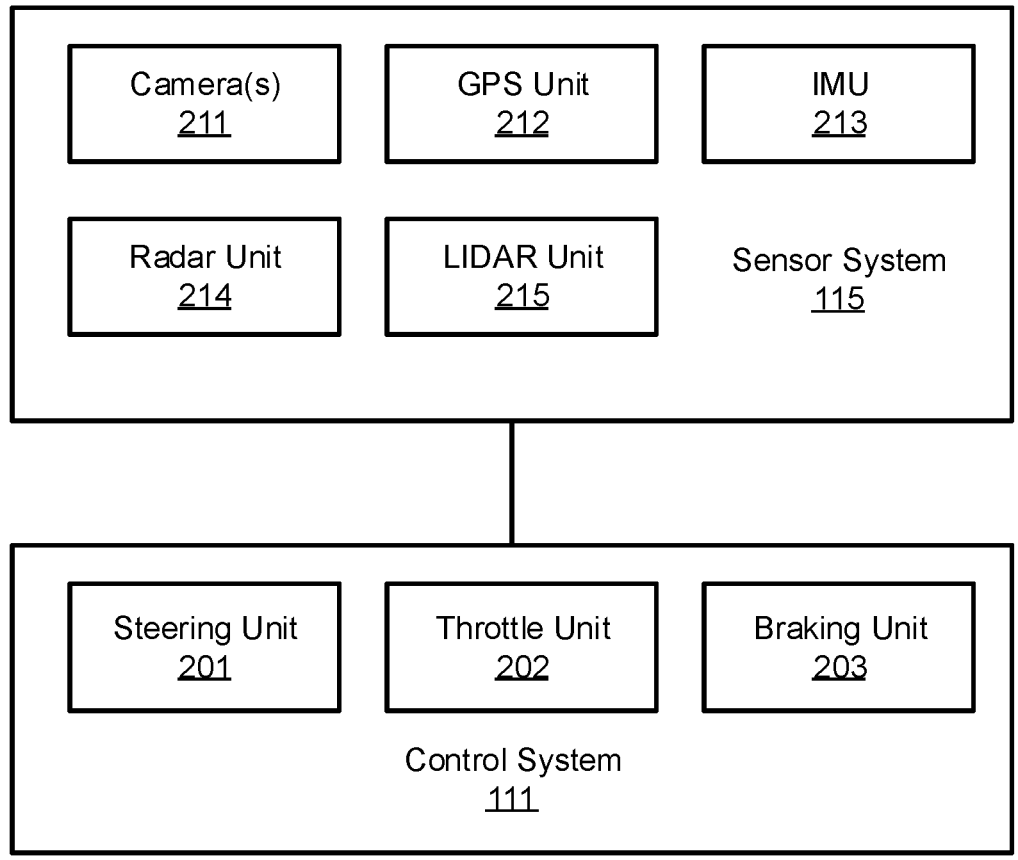
FIG. 2 is a block diagram illustrating an example of an autonomous vehicle according to one embodiment.

Referring now to FIG. 2, in one embodiment, sensor system 115 includes, but is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes, including planning and control algorithm to autonomously drive a vehicle. Algorithms 124 can then be uploaded on ADVs to be utilized during autonomous driving in real-time.

Figure 3A:
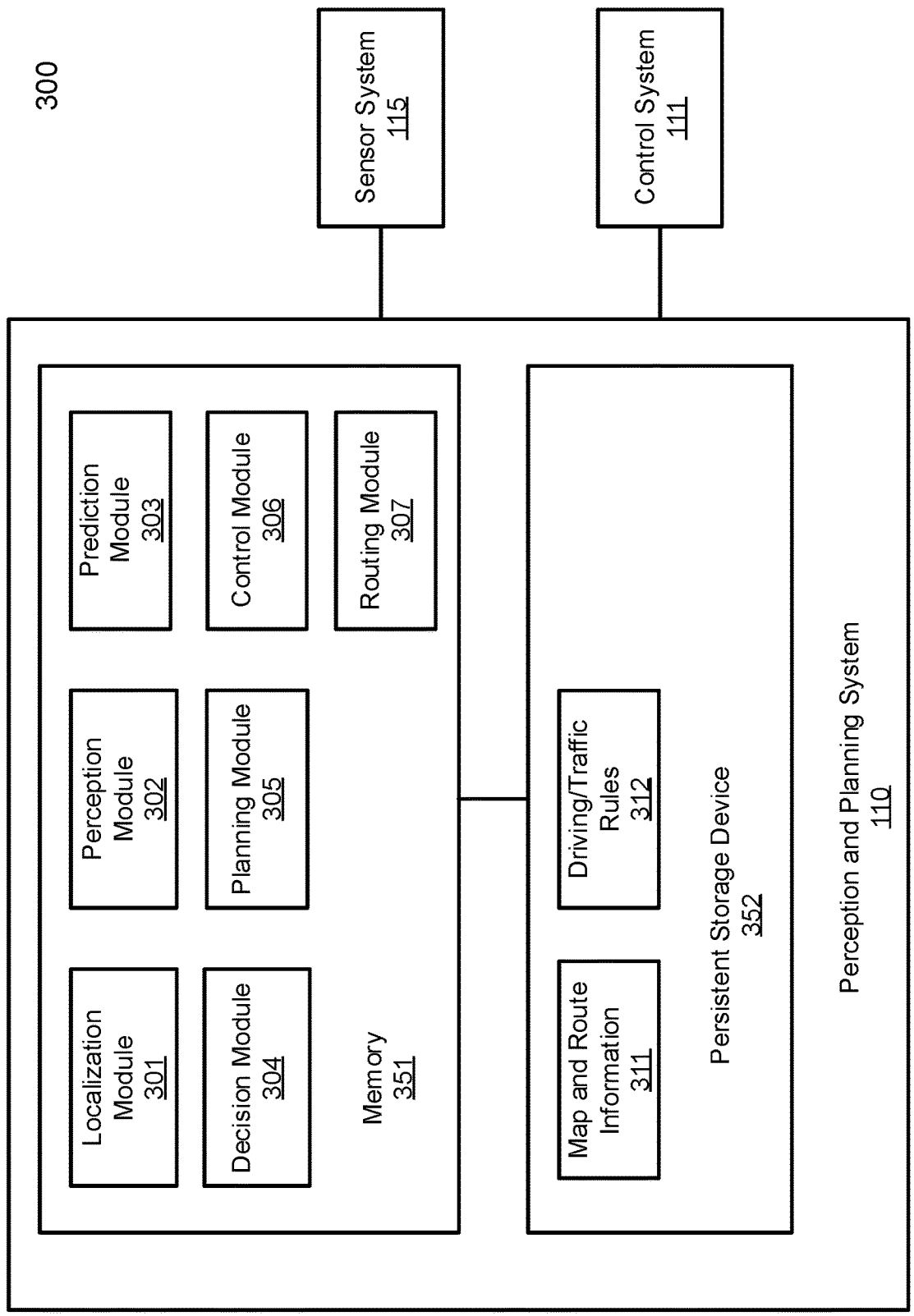
FIGS. 3A-3B are block diagrams illustrating an example of a perception and planning system used with an autonomous vehicle according to one embodiment.
Figure 3B:
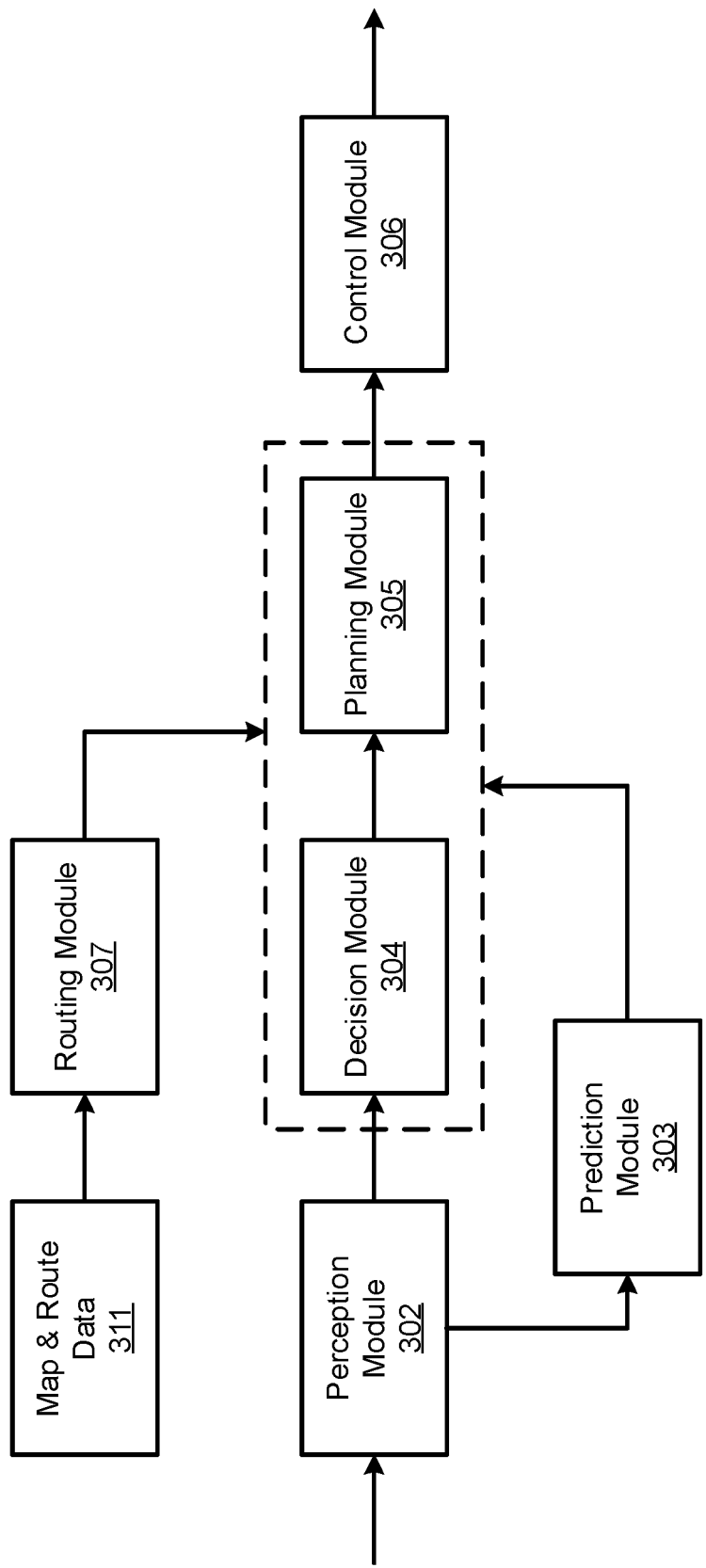

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

A system architecture may represent system architecture of an autonomous driving system as shown in FIGS. 3A and 3B. The system architecture includes, but it is not limited to, from top to bottom, an application layer, a planning and control (PNC) layer, a perception layer, a driver layer, a firmware layer, and a hardware layer. Application layer may include user interface or configuration application that interacts with users or passengers of an autonomous driving vehicle, such as, for example, functionalities associated with user interface system 113. PNC layer may include functionalities of at least planning module 305 and control module 306. Perception layer may include functionalities of at least perception module 302. In one embodiment, there is an additional layer including the functionalities of prediction module 303 and/or decision module 304. Alternatively, such functionalities may be included in PNC layer and/or perception layer. System architecture further includes driver layer, firmware layer, and hardware layer. Firmware layer may represent at least the functionality of sensor system 115, which may be implemented in a form of a field programmable gate array (FPGA). Hardware layer may represent the hardware of the autonomous driving vehicle such as control system 111. The application, planning and control, and perception layers can communicate with firmware layer and hardware layer via a device driver layer.

Figure 4A:
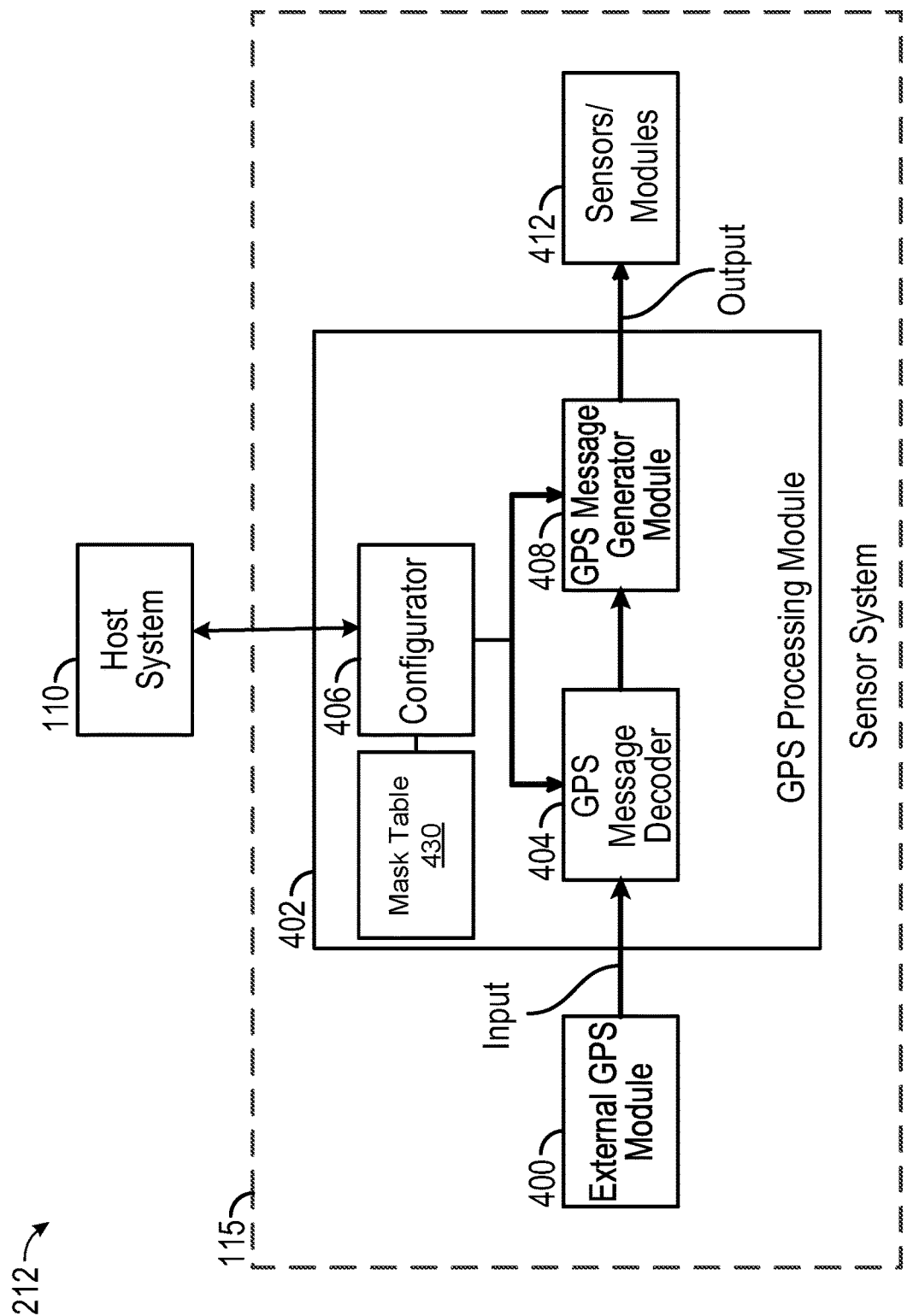
FIG. 4A is a block diagram illustrating an example of a GPS module and a host processor according to one embodiment.

FIG. 4A is a block diagram illustrating an example of a global positioning system (GPS) module 212 coupled to sensors 412 and to a host system 110 according to one embodiment of the present disclosure. Host system 110 represents a planning and control system as described above, which may include at least some of the modules as shown in FIGS. 3A and 3B. GPS module 212 may be the GPS unit 212 shown in FIG. 2. As shown in FIG. 4A, GPS module 212 includes a global positioning system (GPS) hardware module 402 coupled to an external GPS receiver module ("receiver") 400 external to the GPS processing module 402. GPS processing module 402 may be part of a sensor unit coupling between the sensors of FIG. 2 and perception and planning system 110. The sensor unit may be implemented in a form of an FPGA device or an ASIC (application specific integrated circuit) device. In one embodiment, the sensor unit includes, amongst others, one or more sensor data processing modules (also simply referred to as sensor processing modules), data transfer modules, and sensor control modules or logic. These modules can communicate with sensors 412 via a sensor interface and communicate with host system 110 via a host interface such as a PCIe bus. Optionally, an internal or external buffer may be utilized for buffering the data for processing.

For the receiving path or upstream direction, the sensor processing module is configured to receive sensor data from a sensor via sensor interface and process the sensor data (e.g., format conversion, error checking), which may be temporarily stored in buffer. Data transfer module is configured to transfer the processed data to host system 110 using a communication protocol compatible with host interface. Similarly, for the transmitting path or downstream direction, data transfer module is configured to receive data or commands from host system 110. The data is then processed by the sensor processing module to a format that is compatible with the corresponding sensor. The processed data is then transmitted to the sensor.

The sensor control module or logic is configured to control certain operations of sensors, such as, for example, timing of activation of capturing sensor data, in response to commands received from host system (e.g., perception module 302) via host interface. Host system 110 can configure sensors 412 to capture sensor data in a collaborative and/or synchronized manner, such that the sensor data can be utilized to perceive a driving environment surrounding the vehicle at any point in time.

The sensor interface can include one or more of Ethernet, USB (universal serial bus), LTE (long term evolution) or cellular, WiFi, GPS, camera, CAN, serial (e.g., universal asynchronous receiver transmitter or UART), SIM (subscriber identification module) card, and other general purpose input/output (GPIO) interfaces. Host interface may be any high speed or high bandwidth interface such as PCIe (peripheral component interconnect or PCI express) interface. Sensors 412 can include a variety of sensors that are utilized in an autonomous driving vehicle, such as, for example, a camera, a LIDAR device, a RADAR device, a GPS receiver, an IMU, an ultrasonic sensor, a GNSS (global navigation satellite system) receiver, an LTE or cellular SIM card, vehicle sensors (e.g., throttle, brake, steering sensors), and system sensors (e.g., temperature, humidity, pressure sensors), etc.

For example, a camera can be coupled via an Ethernet or a GPIO interface. A GPS sensor can be coupled via a USB or a specific GPS interface. Vehicle sensors can be coupled via a CAN interface. A RADAR sensor or an ultrasonic sensor can be coupled via a GPIO interface. A LIDAR device can be coupled via an Ethernet interface. An external SIM module can be coupled via an LTE interface. Similarly, an internal SIM module can be inserted onto a SIM socket of the sensor unit. The serial interface such as UART can be coupled with a console system for debug purposes. Note that sensors 412 can be any kind of sensors and provided by various vendors or suppliers. Sensor processing module is configured to handle different types of sensors and their respective data formats and communication protocols.

Referring back to FIG. 4A, in one embodiment, GPS processing module 402 includes a GPS message decoder 404 configured to receive as inputs a plurality of GPS messages (e.g., GPS messages 500, 502 shown in FIG. 5) from the GPS receiver module 400 external to the GPS processing module 402 in which each of the GPS messages includes an indication message (e.g., indication message 500 shown in FIG. 5) indicating that a GPS message subsequent to the indication message is valid and a valid GPS message (e.g., GPS message 502 shown in FIG. 5) subsequent to the indication message, wherein the valid GPS message includes at least location and time information. GPS message decoder 404 is further configured to decode the indication message indicating that a GPS message is valid and decode the valid GPS message after decoding the indication message.

As described above, a GPS message can be implemented in a variety of formats dependent upon the specific GPS transceiver vendor. In order to correctly decode a GPS message such as indication message 500 and payload 502, it is important to determine the type or vendor of the GPS message in order to invoke a proper GPS decoding method or algorithm. In one embodiment, GPS processing module 402 maintains a mask table 430 storing a list of masks to represent certain types of GPS messages, which may be provided by a variety of GPS vendors. When a GPS message is received, GPS message decoder determines a type or vendor of the GPS message based on information stored in mask table 430.

Figures 4B, 5:
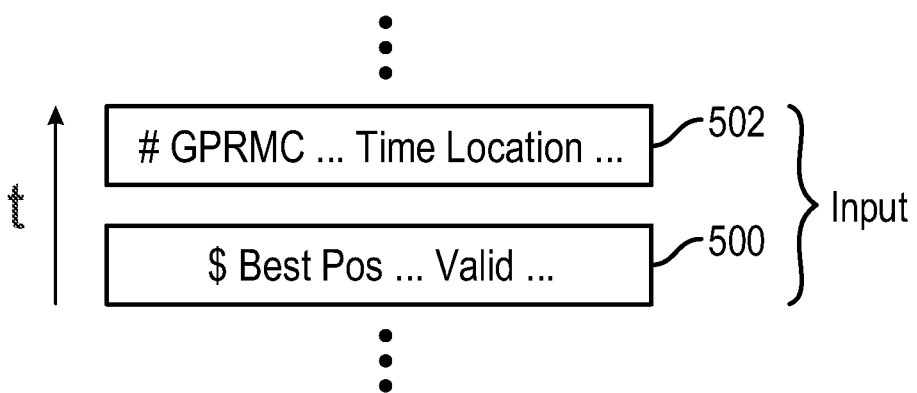
FIG. 4B is a block diagram illustrating a mask table according to one embodiment.
FIG. 5 illustrates an example of GPS messages according to one embodiment.

In one embodiment, when message decoder 404 receives a first GPS message from a GPS sensor, message decoder 404 determines a type of the first GPS message by matching a predetermined field of the first GPS message with a list of predetermined data patterns stored in mask table 430. An example of mask table 430 is shown in FIG. 4B according to one embodiment. In this example, mask table 430 is implemented as a lookup table.

Referring to FIG. 4B, mask table 430 includes a number of entries and each entry corresponding one of the types 431 of GPS messages. Each entry maps a particular type 431 to a set of attributes or parameters that can be utilized to uniquely determine a type of a particular GPS message. The set of attributes includes mask 432, one or more data patterns or signatures 433, and optional matching rules 434. In one embodiment, each of the predetermined data patterns 433, when matching, uniquely represents one of the predetermined types 431 of GPS messages.

In one embodiment, in response to a first GPS message, message decoder 404 obtains a list of masks 432 and data patterns 433 from mask table 430. For each of the entries, message decoder 404 applies a mask of the entry 432 to the first GPS message to select a predetermined field of data and mask out the remaining data of the first GPS message. Message decoder 404 then compares the selected field of the first GPS message with data pattern 433 to determine whether they match. If they are matched, the type corresponding to the matching entry can be utilized as the type of the first GPS message.

Message decoder 404 then decodes a payload of the first GPS message using a decoding algorithm associated with the type of the first GPS message, i.e., the decoding algorithm corresponding to the matching entry. A second GPS message is then generated by GPS message generator 408 based on the decoded payload of the first GPS message. The second GPS message is in a common format that is recognizable or understandable by other components of the autonomous driving system, such as host system 110 that is designed to perceive a driving environment surrounding the vehicle and to plan a path or trajectory to drive the vehicle navigating the driving environment.

A mask basically determines the location of the predetermined field within the GPS message. In one embodiment, a mask may be configured to mask and select multiple fields of a GPS message. The multiple fields of the GPS message may be utilized to collectively represent the type of the GPS message based on a matching rule such as matching rule 434. For example, a first field and a second field of the GPS message may be obtained by masking a mask onto the GPS message. The type of the GPS message may be determined based on matching of the first and second fields against their respective predetermined data patterns. The match rule 434 may dictate how the matching can be utilized to determine the type of the GPS message.

For example, a first field of a GPS message matches a first data pattern and a second field of the GPS message matches a second data pattern. One matching rule may state that a corresponding type of the GPS message can be ascertained if either one of the first field and second field matches its respective pattern. Another matching rule may require that both first field and second field have to match their respective data pattern.

In one embodiment, GPS processing module 402 further includes a configurator 406 coupled to GPS message decoder 404 and coupled to a GPS message generator module 408. Configurator 406 is configured to select different modes for GPS message decoder 404 and GPS message generator module 408. GPS message generator module 408 is configured to receive decoded GPS messages from GPS message decoder 404 and to generate and send as an output the decoded valid GPS message to one or more sensors, one or more sensor processing modules, and/or host 110 in the autonomous driving vehicle. The one or more sensors may correspond to the one or more sensors (211, 213, 214, or 215) shown in FIG. 2. In one embodiment, the output of GPS message generator module 308 may be a National Marine Electronics Association (NMEA) GPS Mobile RMC sentence (GPRMC) message (e.g., message 502) immediately subsequent to or after the indication message (e.g., message 500) as shown in the example of FIG. 5.

In one embodiment, GPS message decoder 404 may include a mask and match circuit to identify or decode the indication message. In an alternative embodiment, GPS message decoder 404 may include a logic gate such as an AND gate or an OR gate to identify or decode the indication message. The mask may be utilized to mask out certain unrelated data, such that only a specific portion of the date is selected to be processed. The selected portion of the GPS message may be utilized to uniquely represent a type of the GPS message that has been implemented by a specific vendor. By masking out the related data fields and only comparing the predetermined field of data, the process can be performed much quicker. That is, each GPS message of a certain type includes a certain data pattern at a specific location of the message. The mask is utilized to select the data at the specific location for the purpose of determining a type of GPS message for decoding.

With reference to FIGS. 4A and 5, an example of a plurality of GPS messages 500, 502 is shown which are received as inputs to GPS message decoder 404 from external GPS module 400. For the sake of simplicity, only two GPS messages are shown. However, a person skilled in the art will understand that many GPS messages are received over the air by the external GPS module 400 and inputted to the GPS message decoder 404. As shown in FIG. 5, the plurality of GPS messages include an indication message 500 indicating that a GPS message subsequent to the indication message 500 is valid and a valid GPS message 502 subsequent to the indication message 500. Once the indication message 500 is decoded or identified by GPS message decoder 404, the subsequent GPS message 502 is deemed a valid GPS message including valid information such as time and location of the autonomous driving vehicle. This process is repeated by the GPS message decoder 404 in order to decode valid GPS messages among the many GPS messages inputted to the GPS message decoder 404. A "Best Position" message and a GPRMC message are but one example of the indication message 500 and valid GPS message 502, respectively. Any suitable GPS messages may be used as an indication message and a valid GPS message. The valid GPS message in the example shown in FIG. 5 is a GPRMC message and the GPRMC message may be suitably decoded by GPS message decoder 404. The indication message 500 may be decoded or identified using several techniques to be described with reference to FIGS. 6A-6C.

Figure 6A:
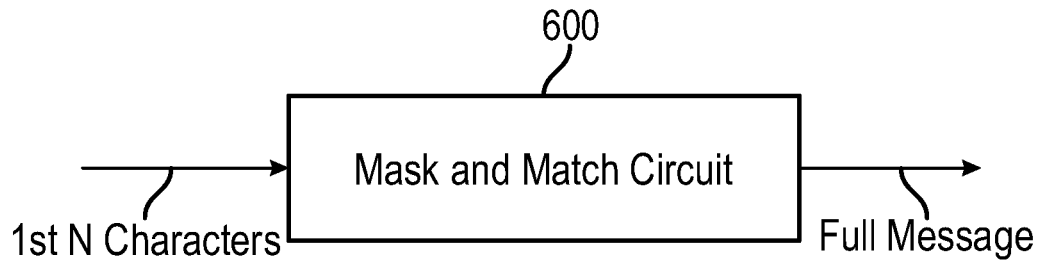
FIGS. 6A-6C illustrate examples of hardware modules used to detect an indication message according to embodiments.

FIG. 6A illustrates an example of a mask and match circuit 600 which may be used to decode the indication message 500 according to one embodiment. Mask and match circuit 600 may include a suitable CAM based search and match circuit to decode the indication message 500. For example, the first N characters (e.g., the first 8 characters: $BestPos) only of the indication message 500 may be detected/decoded instead of decoding the entire indication message 500 which may include a plethora of characters, for example, about 100 characters. The decoded first N characters are then used to match the first N characters to the full indication message, for example, a full Best Position message which may include multiple distinct fields such as a "Valid" field indicating that the information (e.g., time and location) contained in the subsequent GPS message 502 is valid. In one embodiment, N is an integer≥1 but substantially less than the entire number of characters in the full indication message, e.g., $1 \leq N \leq 20$.

Figure 6B:
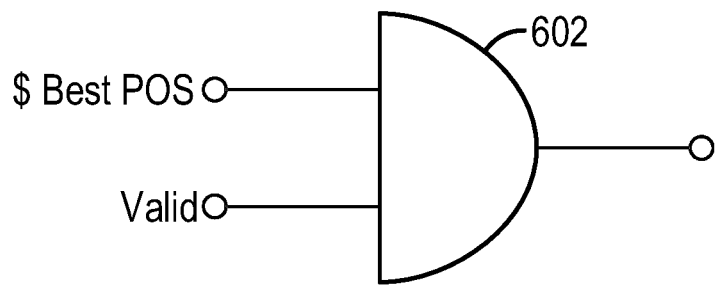
Figure 6C:
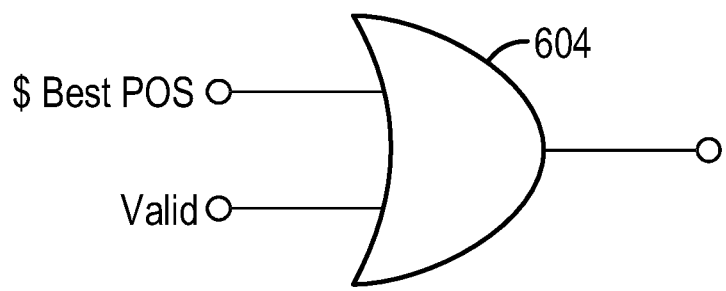

FIGS. 6B and 6C illustrate examples of a logic gate which may be used to decode the indication message 500 according to embodiments of the present disclosure. In one embodiment, as shown in FIG. 6B, an AND gate 602 may be used as a logic gate to receive binary values (e.g., logical ones) as inputs to the AND gate 602 yielding a logical one output which indicates that the indication message 500 has been detected or decoded. For example, logical ones are received as inputs to the AND gate 602 when certain distinct fields within the indication message 500 are decoded, for example, distinct fields such as the first field ($BestPos) and another field (Valid). The Valid field indicates that the information (e.g., time, location) contained in the subsequent GPS message (e.g., GPS message 502) is valid. Hence, upon decoding both of these fields, logical ones are received at the AND gate 602 yielding a logical one output which indicates that the indication message 500 has been decoded and that the subsequent GPS message (e.g., GPS message 502) is valid.

In one embodiment, as shown in FIG. 6C, a logic gate may include an OR gate 604 which receives binary values (e.g., logical ones) as inputs to the OR gate 604 yielding a logical one output which indicates that the indication message 500 has been detected or decoded. For example, logical ones are received as inputs to the OR gate 604 when certain distinct fields within the indication message 500 are decoded, for example, distinct fields such as the first field ($BestPos) and another field (Valid). The Valid field indicates that the information (e.g., time, location) contained in the subsequent GPS message (e.g., GPS message 502) is valid. Hence, upon decoding both of these fields, logical ones are received at the OR gate 604 yielding a logical one output which indicates that the indication message 500 has been decoded and that the subsequent GPS message (e.g., GPS message 502) is valid. In alternative embodiments, any one of the above described fields may be detected and received as an input (e.g., logical one) at the OR gate with the other input being a logical zero yielding a logical one output.

Figure 7:
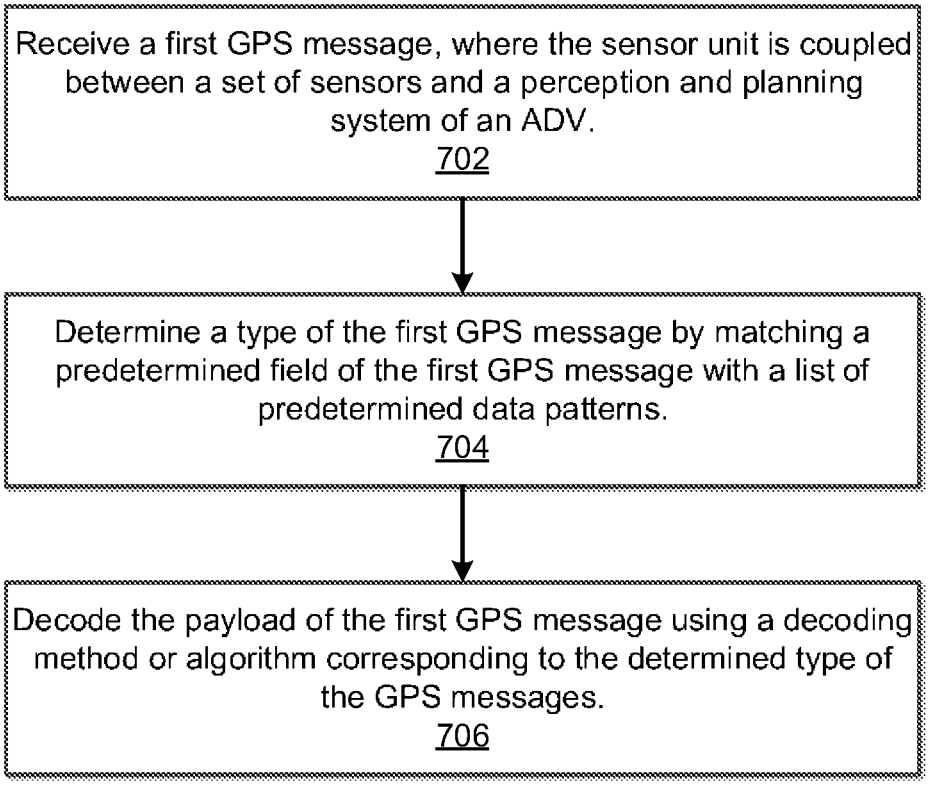
FIG. 7 is a flow diagram of a process of operating an autonomous driving vehicle according to one embodiment.

FIG. 7 is a flow diagram of a process 700 of operating an autonomous driving vehicle according to one embodiment. Process 700 may be performed by processing logic which may include software, hardware, or a combination thereof. For example, process 700 may be performed by GPS message decoder 404. Referring to FIG. 7, in operation 702, processing logic of a sensor unit receives a first GPS message, where the sensor unit is coupled between a set of sensors and a perception and planning system of an ADV. In operation 704, the processing logic determines a type of the first GPS message by matching a predetermined field of the first GPS message with a list of predetermined data patterns. Each of the data patterns represents one of the predetermined types of GPS messages. In operation 706, processing logic decodes the payload of the first GPS message using a decoding method or algorithm corresponding to the determined type of the GPS messages.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
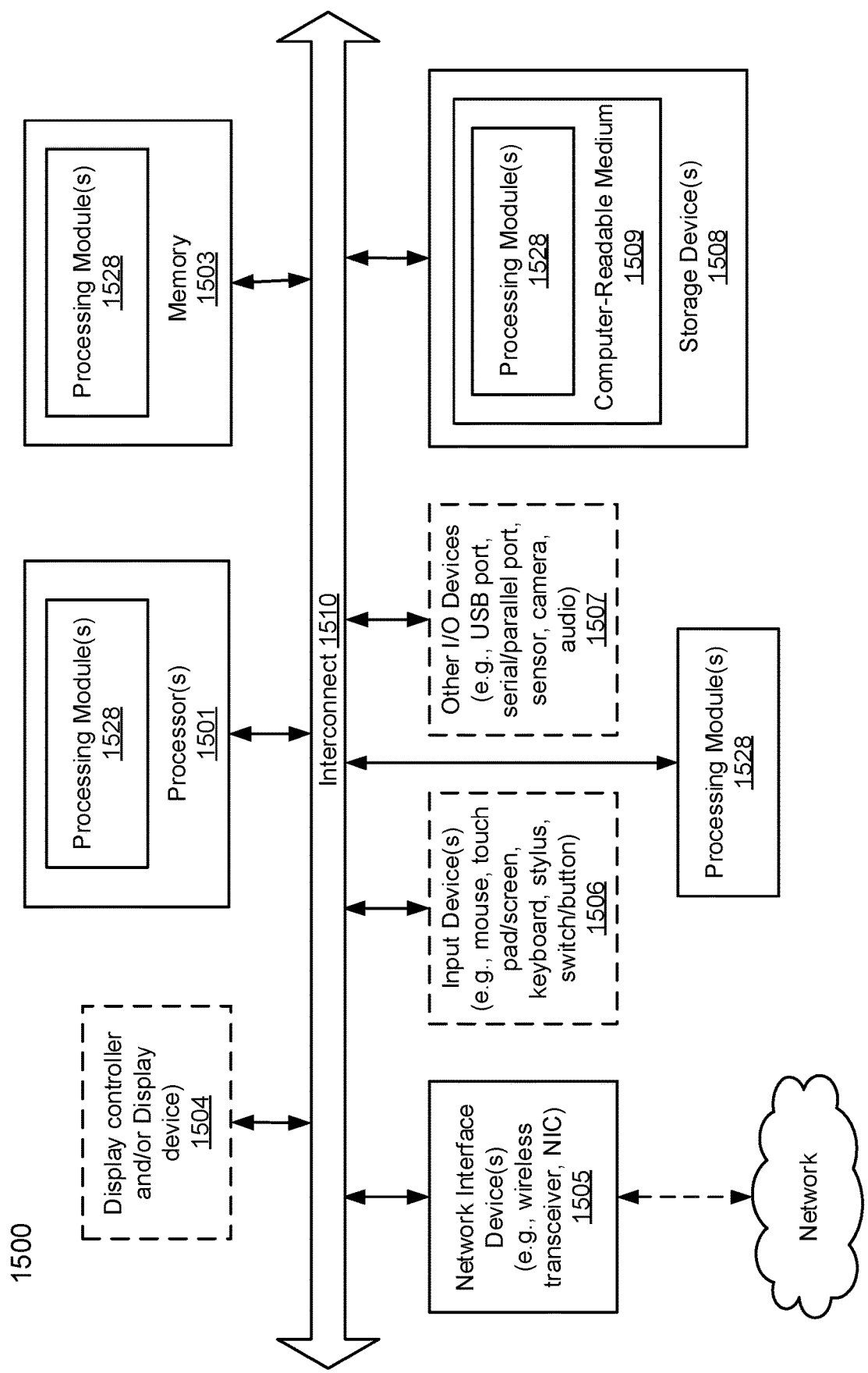
FIG. 8 is a block diagram illustrating a data processing system according to one embodiment.

FIG. 8 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, and control module 306. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for decoding global positioning system (GPS) messages for an autonomous driving vehicle, the method comprising:
   receiving at a sensor unit a first GPS message from a GPS sensor, wherein the sensor unit is coupled between a plurality of sensors and a perception and planning system of an autonomous driving vehicle (ADV);
   determining a type of the first GPS message by matching a predetermined field of the first GPS message with a list of predetermined data patterns, each of the predetermined data patterns corresponding to one of a plurality of predetermined types of GPS messages; and
   decoding a payload of the first GPS message using a decoding algorithm associated with the type of the first GPS message.

2. The method of claim 1, further comprising:
   generating a second GPS message based on at least the decoded payload of the first GPS message; and
   transmitting the second GPS message from the sensor unit to the perception and planning system over a bus, wherein the second GPS message conforms to a predetermined message format recognizable by the perception and planning system.

3. The method of claim 1, wherein determining a type of the first GPS message comprises matching first N characters of the predetermined field of the first GPS message, wherein N is an integer≥1.

4. The method of claim 1, wherein matching a predetermined field of the first GPS message with a list of predetermined data patterns comprises:
   for each of the predetermined data patterns in the list, obtaining a mask corresponding to the predetermined data pattern;
   selecting a portion of the first GPS message by masking out a reminder of the first GPS message using the mask;
   comparing the selected portion of the first GPS message with the predetermine data pattern.

5. The method of claim 4, wherein the mask is utilized to determine a location of the portion within the first GPS message.

6. The method of claim 4, wherein the selected portion of the first GPS message comprises a first portion associated with a first field and a second portion associated with a second field, and wherein the method further comprises:
   performing a first matching operation between the first portion and a first predetermined data pattern associated with the mask;
   performing a second matching operation between the second portion and a second predetermined data pattern associated with the mask; and
   determining the type of the first GPS message based on a first result of the first matching operation and a second result of the second matching operation.

7. The method of claim 6, further comprising:
   determining a matching rule associated with the first matching operation and the second matching operation; and
   performing a logical operation based on the matching rule between the first result and the second result to determine the type of the first GPS message.

8. The method of claim 7, wherein the logical operation comprises a logical OR operation or a logical AND operation, which is determined based on the matching rule.

9. A sensor unit, comprising:
   a sensor interface to be coupled to a plurality of sensors, including a global positioning system (GPS) sensor;
   a host interface to be coupled to a perception and planning system of an autonomous driving vehicle (ADV) over a bus;
   a GPS decoder coupled to the sensor interface and the host interface, wherein the GPS decoder is configured to
      receive a first GPS message from the GPS sensor;
      determine a type of the first GPS message by matching a predetermined field of the first GPS message with a list of predetermined data patterns, each of the predetermined data patterns corresponding to one of a plurality of predetermined types of GPS messages, and
      decode a payload of the first GPS message using a decoding algorithm associated with the type of the first GPS message.

10. The sensor unit of claim 9, wherein the sensor unit further comprises a GPS message generator configured to:
    generate a second GPS message based on at least the decoded payload of the first GPS message; and
    transmit the second GPS message to the perception and planning system, wherein the second GPS message conforms to a predetermined message format recognizable by the perception and planning system.

11. The sensor unit of claim 9, wherein in determining a type of the first GPS message, the GPS decoder is further to match first N characters of the predetermined field of the first GPS message, wherein N is an integer≥1.

12. The sensor unit of claim 9, wherein in matching a predetermined field of the first GPS message with a list of predetermined data patterns, the GPS decoder is configured to:
    for each of the predetermined data patterns in the list, obtain a mask corresponding to the predetermined data pattern;
    select a portion of the first GPS message by masking out a reminder of the first GPS message using the mask;

compare the selected portion of the first GPS message with the predetermine data pattern.

13. The sensor unit of claim 12, wherein the mask is utilized to determine a location of the portion within the first GPS message.

14. The sensor unit of claim 12, wherein the selected portion of the first GPS message comprises a first portion associated with a first field and a second portion associated with a second field, and wherein the GPS decoder is further configured to:
perform a first matching operation between the first portion and a first predetermined data pattern associated with the mask;
perform a second matching operation between the second portion and a second predetermined data pattern associated with the mask; and
determine the type of the first GPS message based on a first result of the first matching operation and a second result of the second matching operation.

15. The sensor unit of claim 14, wherein the GPS decoder is further configured to:
determine a matching rule associated with the first matching operation and the second matching operation; and
perform a logical operation based on the matching rule between the first result and the second result to determine the type of the first GPS message.

16. The sensor unit of claim 15, wherein the logical operation comprises a logical OR operation or a logical AND operation, which is determined based on the matching rule.

17. An autonomous driving system, comprising:
a perception and planning system to perceive a driving environment surrounding an autonomous driving vehicle and to plan a trajectory to navigate through the driving environment;
a plurality of sensors, including a global positioning system (GPS) sensor; and
a sensor unit coupled to the sensors and the perception and planning system, wherein the sensor unit comprises:
a sensor interface coupled to the plurality of sensors,
a host interface coupled to the perception and planning system, and
a GPS decoder coupled to the sensor interface and the host interface, wherein the GPS decoder is configured to
receive a first GPS message from the GPS sensor;
determine a type of the first GPS message by matching a predetermined field of the first GPS message with a list of predetermined data patterns, each of the predetermined data patterns corresponding to one of a plurality of predetermined types of GPS messages, and
decode a payload of the first GPS message using a decoding algorithm associated with the type of the first GPS message.

18. The system of claim 17, wherein the sensor unit further comprises a GPS message generator configured to:
generate a second GPS message based on at least the decoded payload of the first GPS message; and
transmit the second GPS message to the perception and planning system, wherein the second GPS message conforms to a predetermined message format recognizable by the perception and planning system.

19. The system of claim 17, wherein in determining a type of the first GPS message, the GPS decoder is further to match first N characters of the predetermined field of the first GPS message, wherein N is an integer≥1.

20. The system of claim 17, wherein in matching a predetermined field of the first GPS message with a list of predetermined data patterns, the GPS decoder is configured to:
for each of the predetermined data patterns in the list, obtain a mask corresponding to the predetermined data pattern;
select a portion of the first GPS message by masking out a reminder of the first GPS message using the mask;
compare the selected portion of the first GPS message with the predetermine data pattern.

* * * * *